United States Patent [19]

Schwarte et al.

[11] Patent Number: 5,275,847
[45] Date of Patent: Jan. 4, 1994

[54] PROCESS FOR PRODUCING A MULTI-LAYER COATING USING AQUEOUS COATING COMPOUND AQUEOUS COATING COMPOUNDS

[75] Inventors: Stephan Schwarte; Ulrich Poth, both of Münster, Fed. Rep. of Germany

[73] Assignee: BASF Lacke+Farben Aktiengesellschaft, Munster, Fed. Rep. of Germany

[21] Appl. No.: 11,079

[22] Filed: Jan. 29, 1993

Related U.S. Application Data

[63] Continuation of Ser. No. 663,845, filed as PCT/EP89/00949, Aug. 11, 1989, abandoned.

[30] Foreign Application Priority Data

Sep. 28, 1988 [DE] Fed. Rep. of Germany ....... 3832826

[51] Int. Cl.$^5$ .................. C08F 265/02; C08F 267/02; C08L 61/00
[52] U.S. Cl. ................. 427/407.1; 427/409; 524/512; 525/301
[58] Field of Search ............. 427/407.1, 409, 388.2, 427/388.4; 524/510, 533, 512; 525/301

[56] References Cited

U.S. PATENT DOCUMENTS

| | | | |
|---|---|---|---|
| 3,914,463 | 10/1975 | Mercurio et al. | 427/385.5 |
| 3,959,202 | 5/1976 | Blank | 427/388.3 |
| 4,007,306 | 2/1977 | Poy et al. | 427/377 |
| 4,208,465 | 6/1980 | Chang | 427/409 |
| 4,315,053 | 2/1982 | Poth | 427/409 |
| 4,317,037 | 2/1982 | Tobias | 524/533 |
| 4,371,657 | 2/1983 | Chang | 524/512 |
| 4,413,036 | 11/1983 | Drexler et al. | 427/409 |
| 4,522,972 | 6/1985 | Mondt et al. | 524/548 |
| 4,565,730 | 1/1986 | Poth et al. | 427/407.1 |
| 4,731,290 | 3/1988 | Chang | 427/407.1 |
| 4,978,708 | 12/1990 | Fowler | 427/409 |

Primary Examiner—Shrive Beck
Assistant Examiner—Diana Dudash
Attorney, Agent, or Firm—Frank G. Werner; Anne Gerry Sabourin

[57] ABSTRACT

The invention relates to a process for the production of a multi-layered coating in which the aqueous top coating composition contains a water-dilutable polyacrylate resin which has a hydroxyl number of 40 to 200, an acid number of 20 to 100 and a glass transition temperature $(T_G)$ of $-40°$ C. to $+60°$ C. and can be prepared by adding a mixture (I) of a (meth)acrylic acid ester and a copolymerizable monomer containing hydroxyl groups to an organic solvent, subjecting the mixture to free radical polymerization and, when the addition of mixture (I) has ended, adding a monomer containing carboxyl groups and polymerizing the mixture further.

12 Claims, 1 Drawing Sheet

PROCESS FOR PRODUCING A MULTI-LAYER COATING USING AQUEOUS COATING COMPOUND AQUEOUS COATING COMPOUNDS

This is a continuation of copending application Ser. No. 07/663,845, filed as PCT/EP89/00949, Aug. 11, 1989, now abandoned.

BACKGROUND OF THE INVENTION

The invention relates to a process for the production of a multi-layered protective and/or decorative coating on a substrate surface, in which (1) a suitable pigmented base coating composition is applied to the substrate surface, (2) a polymer film is formed from the composition applied in stage (1), (3) a transparent aqueous top coating composition containing a water-dilutable polyacrylate resin as the binder and an aminoplast resin as the crosslinking agent is applied to the base layer thus obtained, and (4) the base layer is then stoved together with the top layer.

The invention also relates to aqueous coating compositions, water-dilutable polyacrylate resins and a process for the preparation of water-dilutable polyacrylate resins.

The process for the preparation of a water-dilutable polyacrylate resin is known. It is used in particular for the preparation of automobile metallic effect lacquerings (compare, for example, U.S. Pat. No. 3,639,147, DE-A-33 33 072 and EP-A-38,127).

For economic and ecological reasons, it is desirable to employ aqueous top coating compositions in stage (3) of the so-called "base coat clear coat" process described above.

It must be possible to apply the top coating compositions by spraying with the aid of automatic lacquering lines. For this, they must have such a high solids content at the spraying viscosity that lacquer films of adequate layer thickness are obtained with one to two spray passes (cross passes), and they must produce stoved lacquer films which exhibit a good appearance (good flow, high gloss, good top lacquer status...).

The aqueous top coating composition disclosed in Example 2 of EP-A-38,127 does not meet all the above-mentioned requirements.

SUMMARY OF THE INVENTION

The object on which the present invention is based consists of providing aqueous top coating compositions which meet the abovementioned requirements.

Surprisingly, this object is achieved by top coating compositions which contain, as the binder, a water-dilutable polyacrylate resin which is obtainable by (I) adding a mixture of
  (a1) a (meth)acrylic acid ester which is copolymerizable with (a2), (a3), (b1) and (b2) and is essentially free from carboxyl groups, or a mixture of such (meth)acrylic acid esters and
  (a2) an ethylenically unsaturated monomer which is copolymerizable with (a1), (a3), (b1) and (b2), carries at least one hydroxyl group per molecule and is essentially free from carboxyl groups, or a mixture of such monomers, and if appropriate
  (a3) an ethylenically unsaturated monomer which is copolymerizable with (a1), (a2), (b1) and (b2) and is essentially free from carboxyl groups, or a mixture of such monomers, to an organic solvent or solvent mixture and polymerizing the mixture in the presence of at least one polymerization initiator, and (II) when at least 80% by weight of the mixture consisting of (a1), (a2) and if appropriate (a3) has been added, adding
  (b1) 60-100% by weight of an ethylenically unsaturated monomer which carries at least one carboxyl group per molecule and is copolymerizable with (a1), (a2) and (a3), or a mixture of such monomers, together with
  (b2) 0 to 40% by weight of an ethylenically unsaturated monomer which is free from carboxyl groups and is copolymerizable with (a1), (a2), (a3) and (b1), or of a mixture of such monomers,
and further polymerizing the mixture, and (III) when the polymerization has ended, at least partly neutralizing the resulting polyacrylate resin and dispersing it in water, the sum of the amounts by weight of (b1) and (b2) always giving 100% by weight and the nature and amount of (a1), (a2), (a3), (b1) and (b2) being chosen so that the polyacrylate resin has a hydroxyl number of 40 to 200, preferably 60 to 140, an acid number of 20 to 100, preferably 25 to 50, and a glass transition temperature ($T_G$) of $-40°$ C. to $+60°$ C., preferably $-20°$ C. to $+40°$ C.

The pigmented base coating compositions to be applied in stage (1) of the process according to the invention are well-known (compare, for example, U.S. Pat. No. 3,639,147, EP-A-38,127, DE-A-33 33 072 and EP-A-279,813). Base coating compositions preferably containing metal pigments, in particular aluminum pigments, are employed in stage (1). Metallic effect lacquerings are in this way obtained.

DETAILED DESCRIPTION OF THE INVENTION

Figure 1:
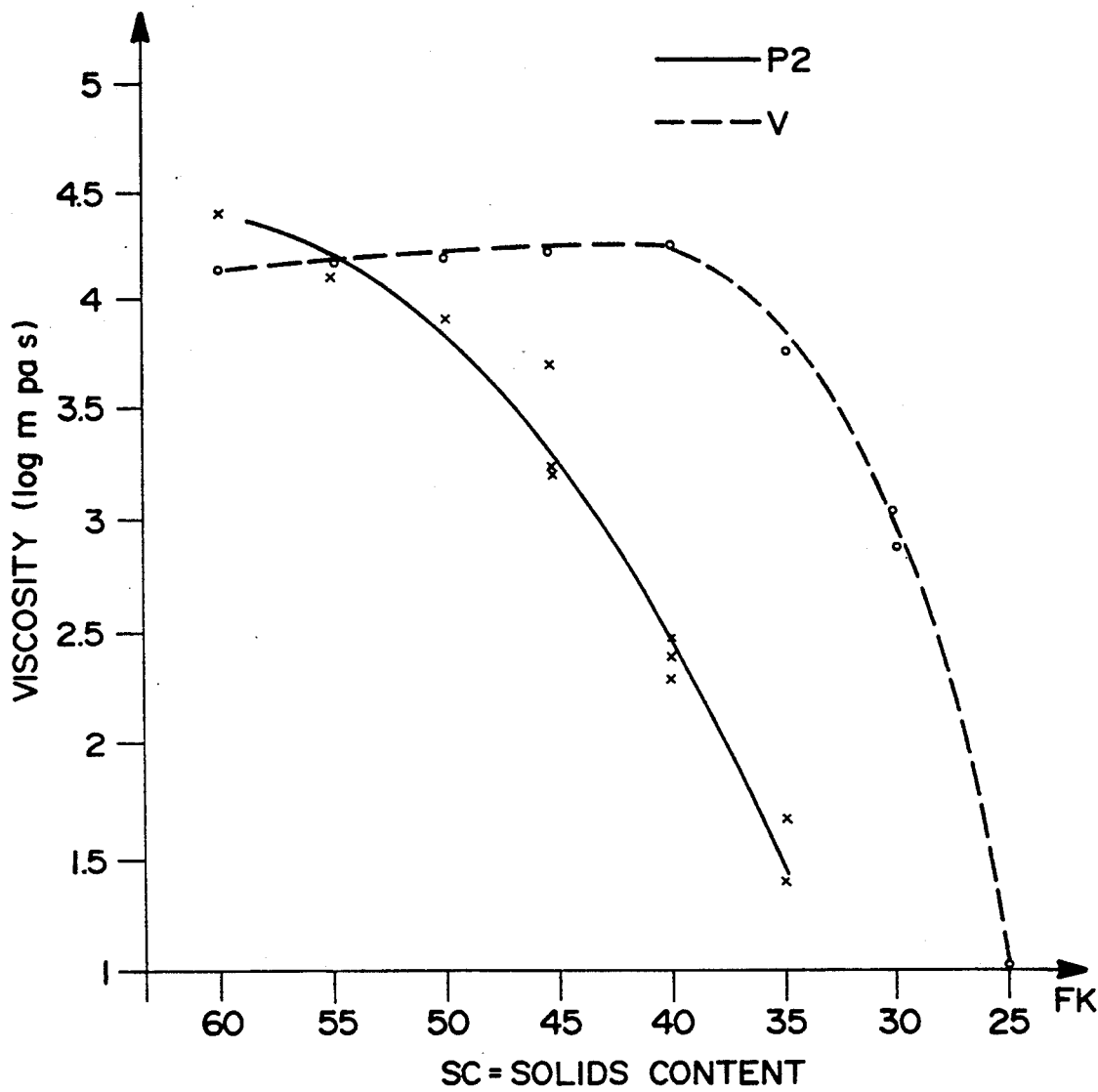
FIG. 1 is a comparison of viscosities of a composition prepared according to the one step polymerization of the invention (V) and a composition prepared by a two step polymerization (P2).

Before the preparation of the polyacrylate resins to be employed according to the invention is described in more detail, two explanations of terms will first be given:

1.) (Meth)acrylic acid is occasionally used as an abbreviation for "methacrylic acid or acrylic acid".

2.) The formulation "essentially free from carboxyl groups" is intended to mean that the components (a1), (a2) and (a3) can have a content of carboxyl groups but, (but at most enough for a polyacrylate resin prepared from components (a1), (a2) and (a3) to have an acid number of at most 10. However, it is preferable to keep the content of carboxyl groups in components (a1), (a2) and (a3) as low as possible. (a1), (a2) and (a3) components which are free from carboxyl groups are particularly preferably employed.

To prepare the polyacrylate resins to be employed according to the invention, any ester of (meth)acrylic acid which is copolymerizable with (a2), (a3), (b1) and (b2) and is essentially free from carboxyl groups, or a mixture of such (meth)acrylic acid esters, can be employed as component (a1). Examples which are mentioned are alkyl acrylates and alkyl methacrylates having up to 20 carbon atoms in the alkyl radical, such as, for example, methyl, ethyl, propyl, butyl, hexyl, ethylhexyl, stearyl and lauryl acrylate and methacrylate, and cycloaliphatic (meth)acrylic acid esters, such as, for example, cyclohexyl (meth)acrylate. Mixtures of alkyl acrylates and/or alkyl methacrylates which consist to the extent of at least 25% by weight of n-butyl and/or t-butyl acrylate and/or n-butyl and/or t-butyl methacrylate are preferably employed as the (a1) component.

All ethylenically unsaturated monomers which are copolymerizable with (a1), (a3), (b1) and (b2), carry at least one hydroxyl group per molecule and are essentially free from carboxyl groups, or a mixture of such monomers, can be employed as component (a2). Hydroxyalkyl esters of acrylic acid, methacrylic acid or another α,β-ethylenically unsaturated carboxylic acid are mentioned as examples. These esters can be derived from an alkylene glycol, which is esterified with the acid, or they can be obtained by reaction of the acid with an alkylene oxide. Hydroxyalkyl esters of acrylic acid and methacrylic acid in which the hydroxyalkyl group contains up to 4 carbon atoms, reaction products of cyclic esters, such as, for example, ε-caprolactone and these hydroxyalkyl esters, or mixtures of these hydroxyalkyl esters or ε-caprolactone-modified hydroxyalkyl esters are preferably employed as component (a2). Examples which may be mentioned of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate and 4-hydroxybutyl methacrylate. Corresponding esters of other unsaturated acids, such as, for example, ethacrylic acid, crotonic acid and similar acids having up to about 6 carbon atoms per molecule, can also be employed.

All ethylenically unsaturated monomers which are copolymerizable with (a1), (a2), (b1) and (b2) and are essentially free from carboxyl groups, or mixtures of such monomers, can be employed as component (a3). Vinylaromatic hydrocarbons, such as styrene, α-alkylstyrene and vinyltoluene, are preferably employed as component (a3).

If appropriate, components (a1), (a2) and if appropriate (a3) are mixed in a suitable organic solvent and added to an organic solvent or solvent mixture and are polymerized there in the presence of at least one polymerization initiator. The solvents and polymerization initiators which are customary for the preparation of polyacrylate resins and suitable for the preparation of aqueous dispersions are employed as organic solvents and polymerization initiators. Examples which may be mentioned of solvents which can be used are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether and 3-methyl-3-methoxybutanol. Examples which may be mentioned of polymerization initiators which can be used are initiators which form free radicals, such as, for example, benzoyl peroxide, azobisisobutyronitrile and t-butyl perbenzoate. The polymerization is carried out at a temperature of 80° to 160° C., preferably 120° to 160° C. The mixture of (a1), (a2) and if appropriate (a3) is added to the organic solvent or solvent mixture in the course of 2 to 8 hours, preferably in the course of 3 to 6 hours, and is polymerized there in the presence of at least one initiator which forms free radicals.

When at least 80% by weight, preferably 100% by weight, of the mixture consisting of (a1), (a2) and if appropriate (a3) has been added, (b1) 60–100% by weight of an ethylenically unsaturated monomer which carries at least one carboxyl group per molecule and is copolymerizable with (a1), (a2) and (a3), or a mixture of such monomers, together with (b2) 0–40% by weight of an ethylenically unsaturated monomer which is free from carboxyl groups and is copolymerizable with (a1), (a2), (a3) and (b1), or a mixture of such monomers, are added to stage (II) and the mixture is polymerized further until the monomers added in stage (I) and (II) have been essentially reacted completely.

It is preferable to add 100% by weight of component (b1) in stage (II). In other words: it is preferable to employ component (b1) in stage (II) without admixing component (b2).

Any ethylenically unsaturated monomer which carries at least one carboxyl group per molecule and is copolymerizable with (a1), (a2) and (a3), or a mixture of such monomers, can be employed as component (b1). Acrylic acid and/or methacrylic acid are preferably employed as components (b1). However, it is also possible to employ other ethylenically unsaturated acids having up to 6 carbon atoms in the molecule. Examples of such acids which may be mentioned are ethacrylic acid, crotonic acid, maleic acid, fumaric acid and itaconic acid. Mono(meth)acryloyloxyethyl maleate, mono(meth)acryloyloxyethyl succinate and mono(meth)acryloyloxyethyl phthalate can also be employed as component (b1).

Any ethylenically unsaturated monomer which is copolymerizable with (a1), (a2), (a3) and (b1), or a mixture of such monomers, can be employed as component (b2). All the monomers listed in the description of components (a1), (a2) and (a3) can be employed as component (b2).

Components (b1) and if appropriate (b2) are preferably added in the course of 10 to 60 minutes, particularly preferably in the course of 15 to 45 minutes.

When the addition of the monomers (b1) and if appropriate (b2) has ended, the mixture is further polymerized until all the monomers employed have been essentially reacted completely.

The nature and amount of components (a1), (a2), (a3), (b1) and (b2) are chosen so that the reaction product has a hydroxyl number of 40 to 200, preferably 60 to 140, an acid number of 20 to 100, preferably 25 to 50, and a glass transition temperature ($T_G$) of $-40°$ C. to $+60°$ C., preferably $-20°$ C. to $+40°$ C.

The glass transition temperatures of polyacrylate resins can be calculated from the following formula:

$$\frac{1}{T_G} = \sum_{n=1}^{n=x} \frac{W_n}{T_{Gn}}$$

$T_G$ = glass transition temperature of the polyacrylate resin $x$ = number of various monomers copolymerized in the polyacrylate resin $W_n$ = weight content of the nth monomer $T_{Gn}$ = glass transition temperature of the homopolymer from the nth monomer The amount and rate of addition of the initiator are preferably chosen so that a polyacrylate resin having a number-average molecular weight of 2,500 to 20,000 is obtained. It is preferable to start the addition of the initiator at the same time as the addition of the mixture of components (a1), (a2) and if appropriate (a3), and to end the addition about half an hour after the addition of component (b1) and if appropriate (b2) has ended. The initiator is preferably added in a constant amount per unit time. When the addition of initiator has ended, the reaction mixture is kept at the polymerization temperature until (as a rule about 1½ hours) all the monomers employed have been essentially reacted completely. "Essentially reacted completely" is intended to mean that preferably 100% by weight of the monomers employed have been reacted, but that it is also possible for a small residual monomer content of not more than up to about 0.5% by weight, based on the weight of the reaction mixture, to remain unreacted.

The polyacrylate resins according to the invention are prepared by employing 40 to 87.5% by weight, preferably 55 to 80% by weight, of component (a1), 10 to 45% by weight, preferably 12 to 35% by weight, of component (a2), 0 to 25% by weight, preferably 8 to 18% by weight, of component (a3), 2.5 to 15% by weight, preferably 3 to 7% by weight, of component (b1) and 0 to 6% by weight of component (b2), the sum of the amounts by weight of (a1), (a2), (a3), (b1) and (b2) always giving 100% by weight.

When the polymerization has ended, the resulting polyacrylate resin is at least partly neutralized and dispersed in water.

Both organic bases and inorganic bases, such as ammonia and hydrazine, can be used for the neutralization. Primary, secondary and tertiary amines, such as, for example, ethylamine, propylamine, dimethylamine, dibutylamine, cyclohexylamine, benzylamine, morpholine, piperidine and triethanolamine, are preferably used. Tertiary amines, in particular dimethylethanolamine, triethylamine, tripropylamine and tributylamine, are particularly preferably employed as neutralizing agents.

The neutralization reaction is in general carried out by mixing the neutralizing base with the polyacrylate resin. The base is preferably added here in an amount such that the top coating composition has a pH of 7-8.5, preferably 7.2 to 7.8.

The partly or completely neutralized polyacrylate resin is then dispersed by addition of water. An aqueous polyacrylate resin dispersion is formed here. If appropriate, some or all the organic solvent can be distilled off. The polyacrylate resin dispersions according to the invention contain polyacrylate resin particles of average particle size of preferably between 60 and 250 nm (measurement method: laser light separation (sic), measuring instrument: Malvern Autosizer 2C).

Top coating compositions according to the invention are obtained from the resulting aqueous polyacrylate resin dispersions by generally known methods by admixing an aminoplast resin and if appropriate other additives, such as, for example, flow control auxiliaries, UV stabilizers, transparent pigments and the like.

The top coating compositions according to the invention preferably contain aminoplast resin in an amount such that the weight ratio between the polyacrylate resin solid and aminoplast resin solid is 60 : 40 to 90 : 10, particularly preferably 70 : 30 to 85 : 15.

In principle, all aminoplast resins which can be processed with the polyacrylate resin according to the invention to give a stable top coating composition can be employed as crosslinking agents. Melamine-formaldehyde resins which are partly or completely etherified with aliphatic alcohols which preferably contain 1 to 4 carbon atoms per molecule are preferably employed as the crosslinking agents.

Before application, the top coating compositions according to the invention are adjusted to the spraying viscosity (in general 20 to 40 seconds flow time from DIN cup 4 (DIN 53 211 (1974)) and a pH of 7.0 to 8.5, preferably 7.2 to 7.8.

The top coating compositions according to the invention
have at the peak (sic) viscosity such a high solids content (20 to 45% by weight, preferably 32 to 40% by weight) that lacquer films of sufficient layer thickness (the thickness of the stoved lacquer film should preferably be between 25 and 45 μm) are obtained with one to two spray passes (cross passes) and
give stoved lacquer films with a very good appearance (good flow, high gloss, good top lacquer status . . . ) and good mechanical-technological properties and
have a relatively low content of organic cosolvents (less than 35% by weight, based on the total solids content of binders and crosslinking agents).

If the top coating compositions according to the invention are used for the production of metallic effect lacquerings together with water-dilutable base coating compositions, metallic effect lacquerings in which the transparent top layer adheres particularly well to the base layer are obtained.

In addition to the polyacrylate resin employed according to the invention, the top coating compositions according to the invention can also additionally contain crosslinked polymer microparticles, such as are described, for example, in EP-A-38,127, and/or other compatible resins, such as, for example, water-dilutable or water-soluble polyacrylate resins, polyester resins, alkyd resins or epoxy resin esters, and they can also be pigmented.

The invention is explained in more detail in the following examples:

A. Preparation of water-dilutable polyacrylate resins according to the invention 20 parts by weight of butylglycol are initially introduced into a 4 l steel kettle equipped with two monomer feeds, an initiator feed, stirrer, thermometer, oil heating and reflux condenser and are heated up to 140° C. A solution of 4.5 parts by weight of butyl perbenzoate in 5 parts by weight of butylglycol is then added at a rate such that the addition has ended after 4 hours 30 minutes. With the start of the addition of the butyl perbenzoate solution, the addition of the mixture of (a1), (a2) and (a3) is also started (compare Table 1). The mixture of (a1), (a2) and (a3) is added at a rate such that the addition has ended after 3 hours 50 minutes. When all the mixture consisting of (a1), (a2) and (a3) has been added, component (b1) (compare Table 1) is added in the course of 20 minutes.

TABLE 1

| Component | | Amounts added in parts by weight | | | | | |
|---|---|---|---|---|---|---|---|
| | | P1 | P2 | P3 | P4 | P5 | P6 |
| (a1) | Butyl acrylate | 24.0 | 22.0 | 27.1 | 22.0 | 22.0 | 22.0 |

TABLE 1-continued

| Component | | P1 | P2 | P3 | P4 | P5 | P6 |
|---|---|---|---|---|---|---|---|
| | Butyl methacrylate | 20.0 | 20.0 | 24.0 | — | 20.0 | 20.0 |
| | Methyl methacrylate | 15.0 | 15.0 | 15.0 | 15.0 | 15.0 | 30.0 |
| | t-Butyl acrylate | — | — | — | 20.0 | — | — |
| | Ethyl methacrylate | — | — | — | — | 7.5 | — |
| (a2) | 2-Hydroxypropyl acrylate | 23.0 | 23.0 | 13.9 | 23.0 | 23.0 | 23.0 |
| (a3) | Styrene | 15.0 | 15.0 | 15.0 | 15.0 | 7.5 | — |
| (b1) | Acrylic acid | 3.0 | 5.0 | 5.0 | 5.0 | 5.0 | 5.0 |

The resin solution thus obtained is neutralized with dimethylethanolamine at about 95° C. up to a degree of neutralization of 80%. Water is then added in an amount such that the solids content of the dispersion is about 60% by weight. The resulting dispersions have the following parameters.

TABLE 2

| | P1 | P2 | P3 | P4 | P5 | P6 |
|---|---|---|---|---|---|---|
| Solids (in % by weight; 1 hour, 130° C.) | 59.4 | 59.4 | 59.0 | 59.6 | 59.0 | 59.5 |
| Acid number | | | | | | |
| theoretical | 23.3 | 38.9 | 38.9 | 38.9 | 38.9 | 38.9 |
| measured | 27.0 | 38.4 | 36.4 | 37.7 | 39.0 | 38.0 |
| Degree of neutralization (%) | 80 | 80 | 80 | 80 | 80 | 80 |
| OH number | 100 | 100 | 60 | 100 | 100 | 100 |
| Particle size (nm)[1] | 114 | 143 | 186 | 106 | 119 | 120 |

[1] The particle size was determined by laser light scattering. Instrument: Malvern Autosizer 2 C.

B. Preparation of transparent aqueous top coating compositions according to the invention Transparent top coating compositions are prepared from 60.00% by weight of a polyacrylate dispersion prepared according to point A, 10.00% by weight of a 90% strength solution of a commercially available water-dilutable melamine-formaldehyde resin in isobutanol (Cymel® 327), 0.05% by weight of a commercially available flow control agent (Fluorad® FC 430) and 29.95% by weight of distilled water and are adjusted with a 10% strength aqueous dimethylethanolamine solution and distilled water to the spraying viscosity (24 seconds flow time from DIN cup 4 (DIN 53 211 (1974)) and a pH of 7.4 to 7.5. The top coating compositions contain 20% by weight of cosolvent, based on the total solids content of polyacrylate resin and melamine-formaldehyde resin.

C. Application of the transparent top coating compositions according to the invention and testing of the stoved lacquer films A water-dilutable base coating composition, pigmented with aluminum platelets, according to EP-A-279,813 is applied to a phosphated steel sheet coated with a commercially available electro-dip coat lacquering and a commercially available filler to give a dry film thickness of 12-15 μm. The base coating composition applied is dried at room temperature for 10 minutes and at 80° C. for 10 minutes. A top coating composition obtained according to point B is then sprayed onto the base layer in two cross passes with an intermediate air exposure time of one minute. Finally, the sheet is dried at room temperature for 20 minutes and stoved in a circulating air oven at 130° C. for 30 minutes. The multi-layered coatings thus obtained were subjected to several tests. The test results are summarized in the following table:

TABLE 3

| | P1 | P2 | P3 | P4 | P5 | P6 |
|---|---|---|---|---|---|---|
| Application solids content (1 hour, 130° C., in % by weight) | 42.0 | 37.2 | 39.1 | 36.8 | 36.0 | 36.5 |
| Thickness of the transparent top layer (in μm) | 41 | 39 | 43 | 33 | 35 | 32 |
| Cross-hatch[1] | 0 | 0 | 0 | 0 | 0 | 0 |
| Gloss[2] | 90 | 92 | 89 | 90 | 90 | 90 |
| DOI | 86.5 | 84.3 | 86.7 | 81.2 | 83.7 | 83.0 |
| Degree of bubbling[3] after exposure[4] | MOGO | MOGO | MOGO | MOGO | MOGO | MOGO |
| Gloss[2] after exposure[4] | 85 | 85 | 84 | 82 | 82 | 82 |
| DOI after exposure[4] | 73.4 | 80.6 | 76.7 | 78.4 | 78.5 | 78.2 |

[1] Testing in accordance with DIN 53 151, including Tesa peel test
[2] Degree of gloss in accordance with DIN 67 530, angle 20°
[3] In accordance with DIN 53 209
[4] 240 hours at 40° C. KK (in accordance with DIN 50 017)

D. Comparison Example

The monomers (a1), (a2), (a3) and (b1) employed for the preparation of the polyacrylate resin P2 according to the invention are mixed and polymerized. The polymerization conditions are the same as for the preparation of the polyacrylate resin P2 according to the invention. The only difference from the preparation of the polyacrylate resin according to the invention is that component (b1) is added not after addition of the mixture of (a1), (a2) and (a3) but together with (a1), (a2) and (a3). An aqueous top coating composition prepared in accordance with B from the polyacrylate resin V thus prepared has a solids content of only 24.1% by weight at a viscosity of 24 DIN seconds (flow time from DIN cup 4 (DIN 53 211 (1974)) and a pH of 7.4 to 7.5.

The following diagram shows the viscosity of the polyacrylate dispersion P2, prepared according to A and diluted with water, as a function of the solids content of the dispersion in comparison with an analogous dispersion of polyacrylate resin V (pH of the two dispersions: 7.8). It is clear that the viscosity of polyacrylate resin dispersion P2 according to the invention at solids contents of 25 to about 53% by weight is lower than the viscosity of the comparable dispersion of polyacrylate resin V.

We claim:
1. A process for the preparation of a water-dilutable polyacrylate resin, wherein monomers (a1), (a2), (a3), (b1) and (b2) are polymerized by a two step solution polymerization process in organic solvent wherein said process comprises the steps of I. forming a mixture of monomers (a1)–(a3) by mixing
   (a1) a (meth)acrylic acid ester selected from the group consisting of alkyl acrylates and alkyl methacrylates having up to 20 carbon atoms in the alkyl radical and cycloaliphatic acrylic and methacrylic acid esters, and mixtures thereof, present in an amount of between 40 and 88 percent by weight based on total weight of (a1)–(b2), with
   (a2) an ethylenically unsaturated monomer which carries at least one hydroxyl group per molecule, selected from the group consisting of hydroxyalkyl esters of acrylic and methacrylic acid, the hydroxyalkyl group having up to 4 carbon atoms, reaction products of cyclic esters and hydroxyalkyl esters of acrylic and methacrylic acid, the hydroxyalkyl group having up to 4 carbon atoms, and esters of unsaturated acids having up to 6 carbon atoms per molecule, and mixtures of such monomers, present in an amount between 10 and 45 percent by weight based on total weight of (a1)–(b2), and
   (a3) an ethylenically unsaturated monomer, including vinyl aromatic hydrocarbons selected from the group consisting of styrene, alpha-alkylstyrene and vinyltoluene and mixtures of such monomers, present in an amount between 0 and 25 percent by weight based on total weight of (a1)–(b2);
   and adding the mixture of monomers (a1)–(a3) to an organic solvent or solvent mixture and polymerizing the mixture, in the presence of at least one polymerization initiator, and after at least 80% by weight of the mixture consisting of (a1), (a2) and (a3) has been added, (II) adding monomers (b1) and (b2) and further polymerizing the mixture wherein
   (b1) is an ethylenically unsaturated monomer which carries at least one carboxyl group per molecule including acrylic and methacrylic acid and ethylenically unsaturated acids having up to 6 carbon atoms and mixtures of such monomers, and is present in an amount between 3 to 7 percent by weight based on total weight of (a1)–(b2); and
   (b2) is an ethylenically unsaturated monomer which is free from carboxyl groups, selected from the group consisting of compounds as described in (a1)–(a3) and mixtures of such monomers, present in an amount between 0 to 6% by weight based on the total weight of (a1)–(b2);
   and after the polymerization has ended, at least partly neutralizing the resulting polyacrylate resin and dispersing it in water, the sum of the amounts by weight of (a1), (a2), (a3) and (b1) and (b2) always giving 100% by weight and the nature and amount of (a1), (a2), (a3), (b1) and (b2) being chosen so that the polyacrylate resin has a hydroxyl number of 40 to 200, an acid number of 20 to 100, and a glass transition temperature ($T_g$) of $-40°$ C. to $+60°$ C., and the polyacrylate resin dispersion has a viscosity ranging from 1.5 to 4.5 log m Pa•s at a solids content of 35 to 60 percent by weight.

2. The process of claim 1, wherein the (a1) alkyl acrylates and alkyl methacrylates include at least 25% by weight of compounds selected from the group consisting of n-butyl acrylate, t-butyl acrylate, n-butyl methacrylate and t-butyl methacrylate and mixtures thereof.

3. The process of claim 1, wherein the (a2) ethylenically unsaturated monomer is selected from the group consisting of hydroxyalkyl esters of acrylic and methacrylic acid having up to 4 carbon atoms, the reaction product of hydroxyalkyl esters of acrylic and methacrylic acid having up to 4 carbon atoms and ε-caprolactone and mixtures thereof.

4. The process of claim 1, wherein the ethylenically unsaturated monomer (b1) is selected from the group consisting of acrylic and methacrylic acid and mixtures thereof.

5. A process as claimed in claim 1, wherein the polymerization in stages (I) and (II) is carried out at a temperature of 80° to 160° C., in the presence of at least one initiator which forms free radicals, and stage (I) takes 2 to 8 hours, and the addition of components (b1) and (b2) is carried out in the course of 10 to 60 minutes.

6. A process as claimed in claim 1, wherein after the addition of 100% by weight of the mixture consisting of (a1), (a2) and (a3), 100% by weight of (b1) is added.

7. A water-dilutable polyacrylate resin which is obtained by the process as claimed in claim 1.

8. An aqueous coating composition containing a water-dilutable polyacrylate resin as the binder and an aminoplast resin as the crosslinking agent, wherein the water-dilutable polyacrylate resin is obtained by the process as claimed in claim 1.

9. An aqueous coating composition containing a water-dilutable polyacrylate resin as the binder and an aminoplast resin as the crosslinking agent, wherein the water-dilutable polyacrylate resin is obtained by the process as claimed in claim 1, wherein the polymerization in stages (I) and (II) is carried out at a temperature of 80° to 60° C., in the presence of at least one initiator which forms free radicals, and stage (I) takes 2 to 8 hours, and the addition of components (b1) and (b2) is carried out in the course of 10 to 60 minutes.

10. An aqueous coating composition containing a water-dilutable polyacrylate resin as a binder and an aminoplast resin as a crosslinking agent wherein the water-dilutable polyacrylate resin is obtained by the two step solution polymerization process as claimed in claim 1, and wherein the polyacrylate resin dispersion has a viscosity ranging from 1.5 to 4.5 log m Pa•s at a solids content of 35 to 60 percent by weight.

11. A process for the production of a multi-layered protective and/or decorative coating on a substrate surface, comprising the steps of
   (1) applying a pigmented base coating composition to the substrate surface,
   (2) forming a polymer film from the composition applied in step (1) to obtain a base layer,
   (3) applying a transparent aqueous top coating composition containing a water-dilutable polyacrylate resin as the binder and an aminoplast resin as a crosslinking agent to the base layer thus obtained, and
   (4) stoving the base layer together with the top layer, wherein, the water-dilutable polyacrylate resin is obtained by the process as claimed in claim 1.

12. The process for the production of a multi-layered protective and/or decorative coating on a substrate surface, as defined in claim 11 wherein step (1) comprises applying a pigmented base coating composition containing metal pigments to the substrate surface.

* * * * *